March 10, 1970   R. CASTAING ETAL   3,500,042
IONIC MICROANALYZER WHICH INCLUDES A CONVEX MIRROR
AS AN ION ENERGY FILTER
Filed Feb. 7, 1966   4 Sheets-Sheet 1

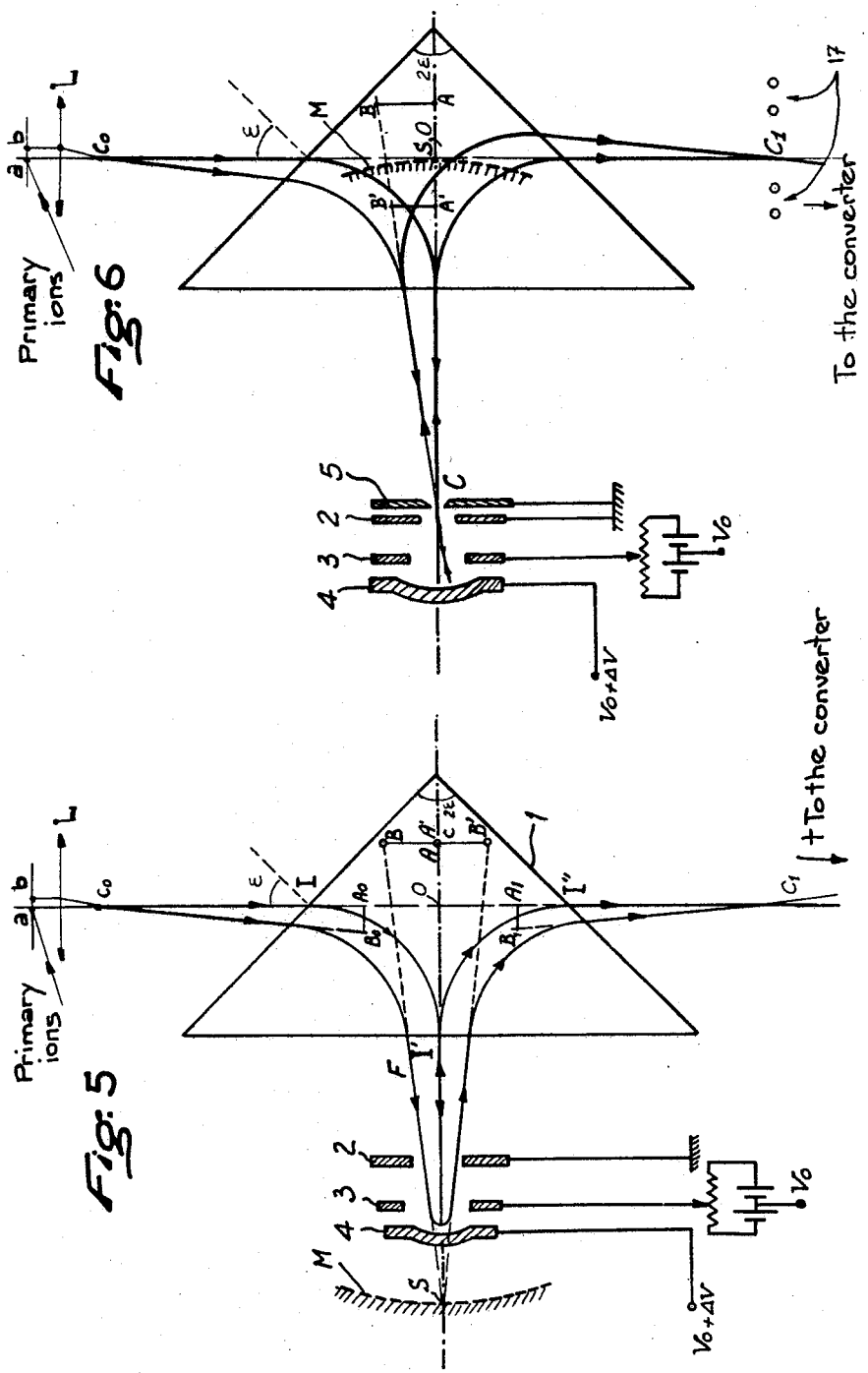

United States Patent Office 3,500,042
Patented Mar. 10, 1970

3,500,042
IONIC MICROANALYZER WHICH INCLUDES A CONVEX MIRROR AS AN ION ENERGY FILTER
Raymond Castaing and Georges Slodzian, Paris, France, assignors to CSF-Compagnie Generale de Telegraphie Sans Fil, a corporation of France
Filed Feb. 7, 1966, Ser. No. 525,447
Claims priority, application France, Feb. 9, 1965, 4,833
Int. Cl. H01j 37/26
U.S. Cl. 250—49.5                       4 Claims

ABSTRACT OF THE DISCLOSURE

In an ionic microanalyzer, wherein an electronic mirror receives from a magnetic prism a beam of ions, said beam providing a virtual image of the surface of a sample inside said prism, and said mirror eliminating from the beam those ions having an energy higher than a predetermined threshold and reflecting back the other ions toward the prism, this mirror is a convex mirror whose center and apex are so located as to allow, on the one hand, a better selection of the ions as to their momentum-to-charge ratio and, on the other hand, a substantial achromatically of the selective ion image provided by the beam after it has crossed the prism for the second time.

---

The present invention relates to ionic microanalyzers.

The applicants have described in the copending patent application Ser. No. 518,453 a continuation of patent application No. 326,566, now abandoned, for "Microanalyzers by Secondary Emission," an arrangement for carrying out micro-analysis by bombardment with ions or neutral atoms, wherein there is provided, in the corpuscular optics aimed at providing an image of the sample by means of secondary ions, an electrostatic device for filtering ions according to their energy in addition to the arrangement for filtering them according to their momentum (or momentum-to-charge ratio where ions having different charges are present). To simplify the language, it is assumed hereinafter that all the ions have a single positive charge.

In one arrangement according to the above patent application the optical system comprises a magnetic prism, which deflects a secondary ion beam onto an electrostatic filtering mirror which eliminates the ions emitted with an initial energy greater than a predetermined value and which reflects back the other ions toward the prism.

It is an object of the invention to improve such an arrangement.

For example, in one of such arrangements, a mirror equivalent to a spherical concave mirror has been used. Under those conditions, the point of first convergence or "crossover" of the beam at the output of the magnetic sector must be located beyond the reflecting electrode. It follows therefrom that it is impossible to insert at this point a diaphragm capable of selecting, prior to their entry into the mirror, ions with a momentum whose value is comprised within narrow predetermined limits; it can then occur that parasitic trajectories, penetrating into the mirror at some appreciable distance from the axis, are reflected with considerable aberrations and interfere with the final image, in spite of the selecting slit located on the path of the reflected ions, after the second crossing of the prism.

Moreover, the trap electrode which eliminates the ions whose energy is too high is ultimately contaminated by those, so that an organic insulating contaminating layer forms on its surface unless extreme precautions are taken for obtaining ultra-vacuum in the space. The resulting differences of potential between the various zones of the surface are such that the same can no longer be regarded as equipotential, and parasitic deviations of the trajectories in the vicinity of the crossover of the beam effect the quality of a large part of the image.

The present invention avoids the above-mentioned drawbacks, and further presents the advantage of the obtention of a substantially achromatic image, through a suitable design of the mirror and prism arrangement.

For a better understanding of the invention and to show how the same may be carried into effect, reference will be made to the drawings accompanying the following description and wherein:

FIG. 5 shows the relative positions of the successive images of the object to be analyzed as they generally appear in systems according to the above mentioned patent;

FIG. 6 shows the same relative positions of the images in the arrangement according to the invention.

Figure 1:
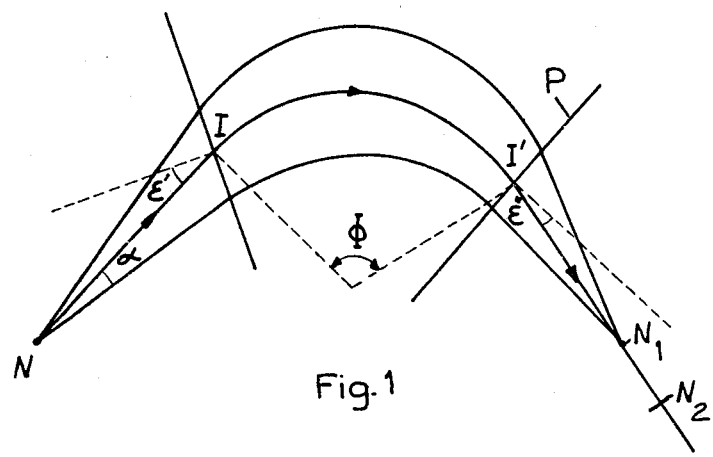
FIG. 1 is a diagram explaining the operation of a magnetic prism.

In FIG. 1, a magnetic prism P is considered. It is built up by a portion of space limited by two planes and wherein prevails a uniform induction $B_m$, parallel to the edge of the prism.

This magnetic prism is shown by its cross section, perpendicular to the induction, which will be called a radial section.

The radial section considered here is that radial section which is located in the middle of the gap limited by the two pole pieces of the prism.

Let it be assumed that the magnetic prism is placed in a region of space where the electric field is nil and that an ion, having a mass $m$ and a charge $e$, has been so accelerated by a potential difference $V$ that its velocity vector $v$ in a space portion where there is no field is contained in the radial section. The trajectory of this ion, shown in FIG. 1, is followed with a constant speed and is entirely contained in the radial section. It is formed by a rectilinear portion CI, which makes an angle $\epsilon'$ with the normal at I to the entrance face of the prism, and is followed by an arc II' of $\Phi$ radians and having a radius $$R = \sqrt{\frac{2m}{e}} \cdot \sqrt{\frac{V}{B_m}}$$

A rectilinear portion I'C$_1$, making an angle $\epsilon''$ with the normal at I' to the emergence face of the prism, follows the arc of circle. The two rectilinear portions merge into the circular portions to which they are tangent.

Angles $\epsilon'$ and $\epsilon''$ which are taken positive in the counter-clockwise direction, are formed by the trajectory, oriented in the direction followed by the particles, with the normal to the prism oriented inwardly thereto at the incidence and outwardly thereto at the emergence.

Only those beams of ions, which are in the vicinity of the mean trajectory will be considered. This mean trajectory will be called the optical axis. The cylindrical surface, normal to the prism section and whose trace in this section is the optical axis will be called the transverse section of the prism.

In order to make apparent the focusing properties of the prism, an incident ion beam will be considered: it has a small aperture bound by linear trajectories originating at a point N and contained in a cone of revolution having an axis NI and an apex half angle $\alpha$. All the ions of the beam are assumed to have the same mass, charge and velocity.

The trajectories of the ions whose velocity vector at the point N is contained in the plane of the radial section remains in this plane and converge, after deflection by the prism, at a point $N_1$ of the optical axis.

The trajectories of the ions, whose velocity vector at the point N is in the transverse section of the prism, remain in this section; because of the oblique incidence, they diverge or converge at the entrance of the prism according to whether $\epsilon'$ is positive or negative.

In the same manner there is convergence or divergence at the output of the prism according to whether $\epsilon''$ is positive or negative.

In the case of FIG. 1, the trajectories considered converge, at the first order in $\alpha$, at a point $N_2$ of the optical axis.

If all the trajectories originating from N are considered together, they converge on two focal lines: a focal line parallel to the magnetic induction and passing through the point $N_1$ and another line contained in the radial plane of the prism and normal at $N_2$ to the optical axis.

The prism is thus an astigmatic system for any object point.

However, by suitably selecting the angles $\epsilon'$ and $\epsilon''$ it is possible to bring into coincidence $C_1$ and $N_2$, thus making the prism stigmatic for point N and its conjugate.

In the ionic analyzer according to the above mentioned copending patent application, use is made of certain particular prisms having two pairs of stigmatic points, not only to obtain a focalization into a crossover of the ion beam but also for forming an ionic image of the sample surface.

Figure 2:
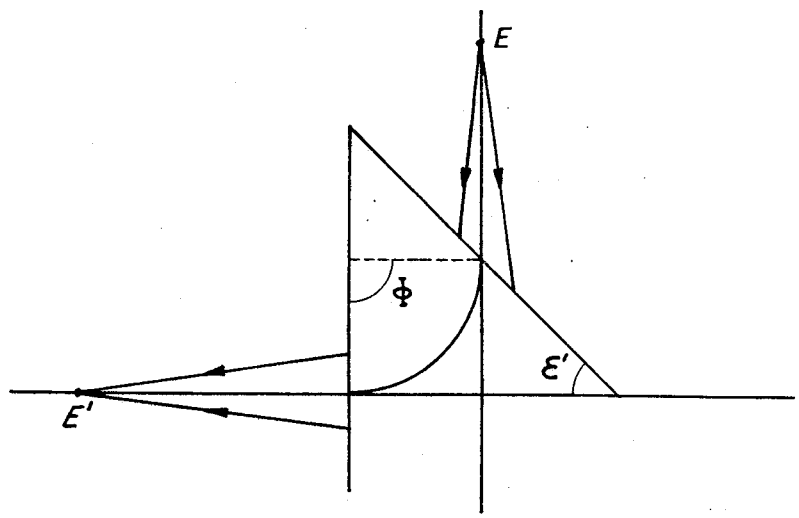
FIGS. 2, 3 and 4 are explanatory figures.

For example, the prism of FIG. 2, wherein $\tan \epsilon'=1$, $\epsilon''=0$ and $\Phi=\pi/2$, is used.

Figure 3:
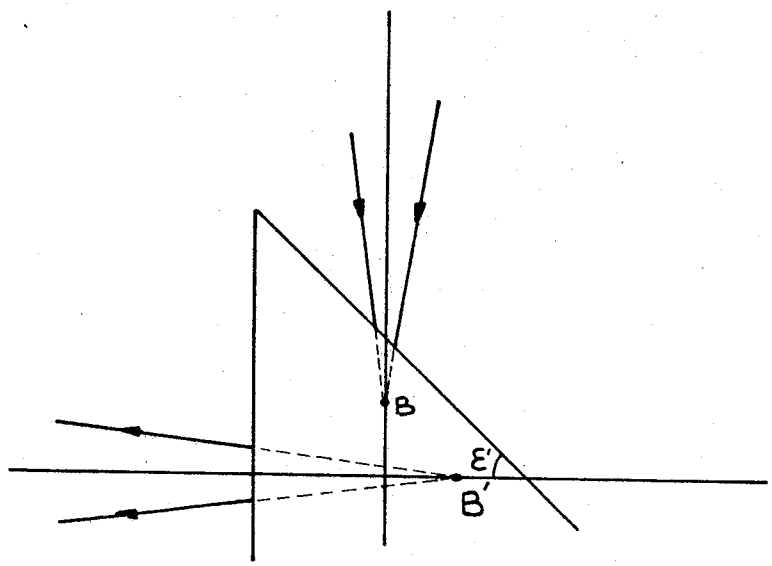

In such a prism there exist two pairs of stigmatic points: one pair of real points E and E', as shown in FIG. 2, and one pair of virtual points H and $H_1$, as shown in FIG. 3.

The Cotte theory (Maurice Cotte: doctorate thesis: "Recherches sur l'optique electronique," Masson et Cie, Paris, 1938) shows the exact position of these points.

The achromatic focal line of such a prism will now be defined.

Figure 4:
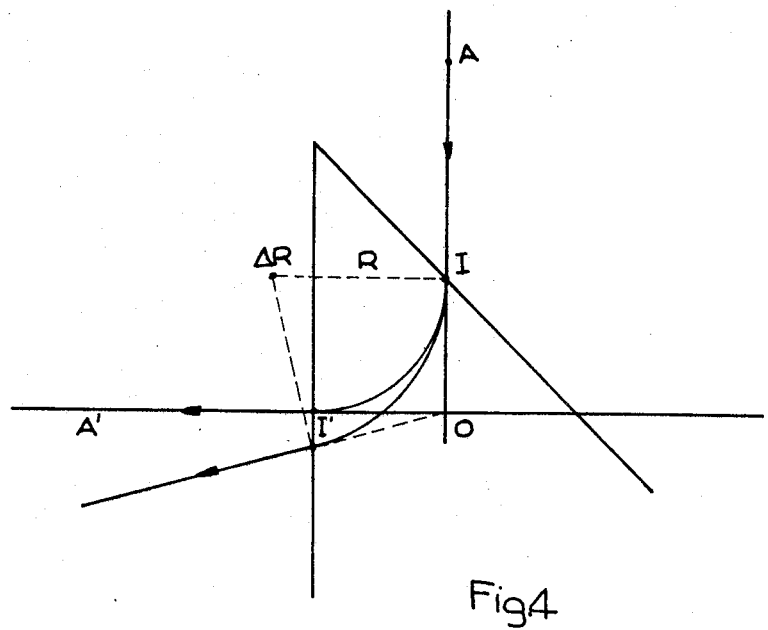

Let a trajectory of an ion having a mass $m$, a charge $e$ and a velocity $v$, be considered; this trajectory, shown in FIG. 4, follows the optical axis EII'E'.

It will be assumed that another ion having the same mass, the same charge and a slightly greater velocity $v+\Delta v$, meets the prism along the same incident trajectory.

Within the prism, it will follow an arc of circle having a radius $R+\Delta R$. It may be readily shown that virtual prolongation, into the prism, of the trajectory passes, disregarding first order terms in $\Delta v$, through the point O, which is the intersection of EI and E'I'.

In other words, the ions of the same nature, but having a certain velocity dispersion, and propagating towards the prism along EI, have trajectories whose prolongation into the prism contact a focal line which is normal at 0 to the radial plane of the prism. This focal line will be hereinafter called the achromatic focal line and O the achromatic point.

FIG. 5 shows diagrammatically the respective position of the successive images in a tested arrangement according to the above mentioned copending patent application. A prism is formed by two prism portions symmetrically contacting each other; it is similar to that of FIG. 2 and operates in the same way, as far as the first crossing of the prism is concerned.

The optical axis of the beam has two rectilinear portions, whose prolongations intersect at O, with $$OI=OI'=R$$

Point O is the achromatic point for the first crossing of the prism by the beam: it will also be called the center of the prism.

The sample $ab$, which is bombarded by the primary ions or other particles emits secondary ions which are accelerated and focused by an electrostatic lens L, to give the sample surface a real image which, in the absence of the prism, would be formed at $Ao\ Bo$. This image, which has not yet been filtered, is formed by the superimposition of the component images provided by the ions of different natures.

Lens L is so located and adjusted that its crossover $Co$ and point $Ao$ are respectively at the object real stigmatic point and the object virtual stigmatic point corresponding to the first crossing of the prism by the beam (i.e. the points respectively corresponding to point E in FIG. 2 or 4, and to point H in FIG. 3).

The induction of the prism is so adjusted that the ions of a given nature, selected to form the final image and emitted by the sample with an initial zero velocity, describe within the prism arcs of circle having a radius R. It has been assumed that those secondary ions are positive.

Under such conditions, the first crossing of the prism gives of $Ao\ Bo$, which is a virtual object for the prism, a virtual image which is formed at AB by the selected ions.

The electrostatic mirror comprises three electrodes 2, 3 and 4 according to an arrangement similar to that of an emission lens. The center of the mirror is at the crossover of this lens, while its apex coincides with the image, which it would give of the center of electrode 4, should the latter be emissive.

In the arrangement of FIG. 5, the shape of the electrodes and the bias applied to the control electrode 3 have been so selected that this image should be virtual, so that the mirror is a concave mirror with an apex S and a center C. The equivalent optical mirror is shown in dotted line in FIG. 5. The trap electrode is at a potential $Vo+\Delta V$ which is slightly higher than that of the sample in absolute value; it is solid and the ions, which have been emitted by the object with too high an initial energy, strike this electrode and are, for all practical purposes, eliminated from the final image.

The mirror is so located that its apex S and center C respectively coincide with the image real stigmatic point and the image virtual stigmatic point corresponding to the first crossing of the prism by the beam.

It follows that the image of AB is A'B', which is symmetrical of AB with respect to C (A, A' and C coincide in FIG. 5) and the final image $A_1\ B_1$ of the system formed by the prism, the mirror and again the prism, is symmetrical of the incident image $Ao\ Bo$ furnished by the emission lens with respect to the plane perpendicular to the plane of the figure, passing through points S and C.

Image $A_1\ B_1$ forms an object for the converter system (not shown) which converts the ionic image into an electron image which is displayed, for example, on a fluorescent screen, as indicated in the French Patent 1,240,658.

This arrangement has a drawback. Since the point of convergence after the first crossing of the prism, i.e. the second crossover, is at S, beyond the lens which acts as electrostatic mirror, no diaphragm can be placed at this point and undesirable trajectories can penetrate into the mirror at substantial distance from the axis and affect after reflection the final image. The filtering of the ions according to their energy is not perfect owing to the aberrations of the mirror for trajectories away from the axis. Moreover, as indicated above, any local superficial defect of the trap electrode 4 will affect the trajectories in the vicinity of the crossover and causes a deterioration of a substantial part of the image.

To overcome this drawback, the invention provides the arrangement according to FIG. 6 in which the same reference numerals designate the same parts as in FIG. 5.

This arrangement is such that the second crossover is located between the electrostatic mirror and the magnetic prism.

By means of a suitable control of the voltages applied to the electrodes 3, 4 and a correct choice of their respective configurations, the electrostatic mirror is made equivalent to a spherical convex mirror (mirror M shown in dotted line in FIG. 6) with the centre C at said second crossover and the apex S at the centre of the prism. AB is the virtual image from which the ion beam seems to originate after its first passage through the magnetic prism. The image of A, provided by the mirror M, is A', and that of B is B'. $A_1$ and A' are no longer stigmatic points for the second crossing of the prism, but a stigmator 17, located at the emergence crossover $C_1$ makes it possible to correct the transverse astigmatism which results therefrom with regard to the final image. This stigmator is anyway necessary for correcting the transverse astigmatism in the first image supplied by the lens I, forming the sample an emission lens.

A diaphragm S, with a very small circular aperture, which could also be replaced by a selection slit, may be centered on point C of the second crossover. Thus, the drawback indicated above is avoided.

In fact, this diaphragm forms a first ion filter. Only those ions pass therethrough, the momentum of which lies within a small range of values, the width of which is determined by the deflecting prism. The other ions are captured by the edges of the aperture. It follows that the mirror returns to the deflecting device only those ions which have been filtered both according to their energy and to their momentum.

Thus the second deflection of the beam is used only for directing the ions onto the optical system, necessary for forming the final image. A selection slit is provided at the final crossover $C_1$ for eliminating parasitic ions emitted by the trap electrode of the mirror. It should be noted that the final image is far less sensitive to a local defect of the electrode 4, which will affect it only slightly and locally, because the electrode 4 is near an intermediate image (formed by the ions incident on the mirror upon their turning base) and no longer adjacent to a crossover as above. (The cathode center and the apex of the equivalent mirror are conjugate points with respect to the electrostatic mirror considered as an emission lens.)

It should also be noted that the arrangement of FIG. 6, where the intermediate image AB is located exactly at the image virtual stigmatic point, corresponding to the first crossing of the prism, is by no means necessary.

The final image is in fact achromatic, whatever its position along the axis since the centre of the prism, where the apex of the mirror is located, is, by reasons of symmetry, an achromatic point for the second crossing of the prism as well as for the first one. It is therefore possible to modify the adjustment of the emission lens L to move, for example, the point A to S. A' will then coincide with A and the electrode 4 is still practically at an intermediate image, but the intermediate image AB is no longer entirely stigmatic; this defect can be corrected by providing a stigmator at the first crossover $C_0$ (or at the second crossover at C). Many other positions can be chosen for the intermediate image AB, which makes the apparatus highly flexible and permits easy modifications of magnification. Only the stigmatism needs to be adjusted for each enlargement, the achromatism is always maintained.

It is also possible, by a suitable choice of the angle $2\epsilon$ at the apex of the prism, to make the image virtual stigmatic point (point H' in FIG. 3) coincide with the centre of the prism.

However, in such a case, both object stigmatic points are virtual (at the same time as point H' of FIG. 3 is shifted to O, point E of FIG. 4 is shifted beyond O), so that it is necessary to add a lens between the first crossover and the magnetic prism.

By way of example a third possible adjustment of the mirror may be mentioned. It consists, while placing the centre of the mirror at the second crossover, after the first crossing of the prism, as in the case in FIG. 6, in displacing its apex slightly so as to move it to the image virtual stigmatic point corresponding to the first crossing of the prism. The energization of the emission lens L will be then so adjusted that the intermediate image AB is centered on this same virtual stigmatic point, as was the case in FIG. 6 (with another location of this point). The prism-mirror-prism system is then strictly stigmatic, but a slight chromatic defect exists in the image. However, this drawback is reduced by the fact that the dispersion is very low and the energy filtering reduces the importance of the chromatic aberration still further.

Figure 7:
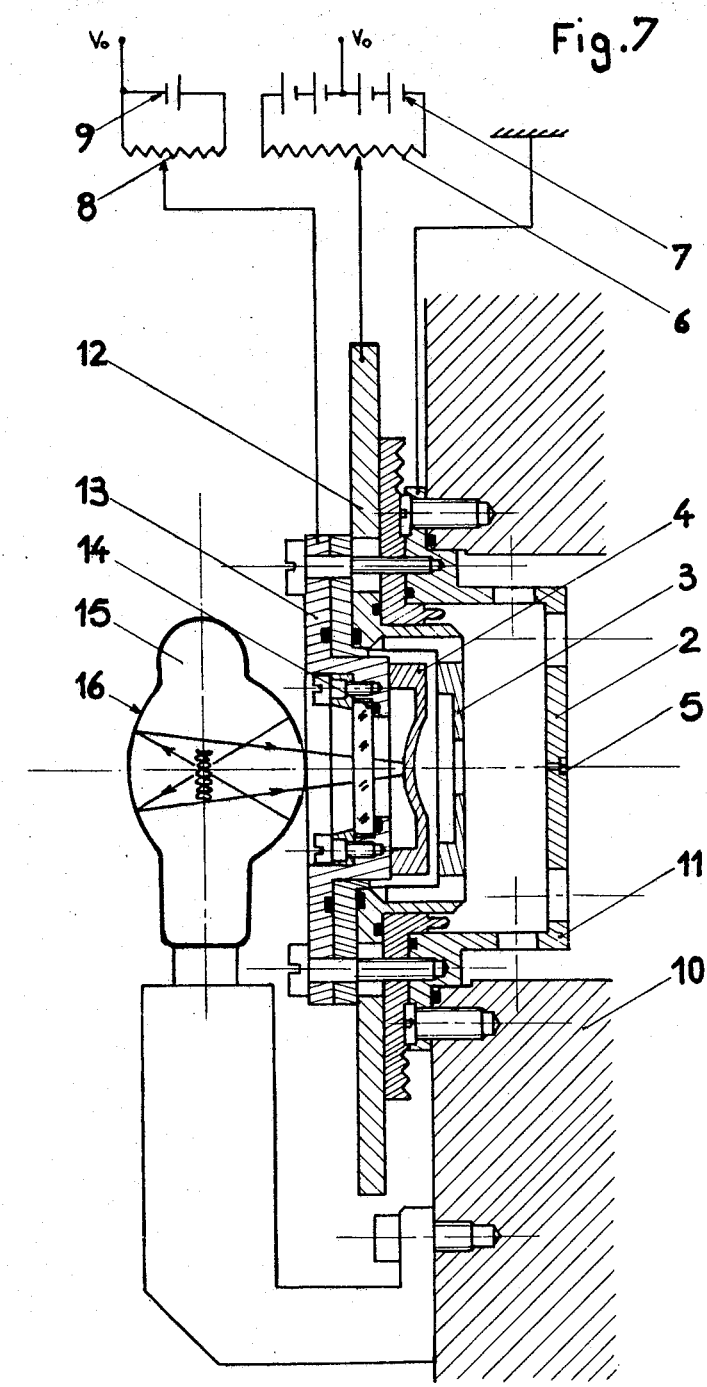
FIG. 7 shows by way of example an embodiment of the arrangement according to the invention.

FIG. 7 shows in section an embodiment of the electrostatic mirror used in the analyzer according to the invention. The same reference numerals have been used for the same parts as shown in FIG. 6. The electrostatic reflection optics comprises an electrode 2 provided with a selection aperture placed at the point of the second crossover of the beam (electrode 2 thus also playing the part of the above described diaphragm C) a Wehnelt electrode 3, and a trap electrode 4.

The electrode 2 is grounded. The electrode 3 is raised to an adjustable potential by means of a potentiometer 6 supplied by a battery 7, near the positive potential $V_0$ of the object.

The electrode 4 is supplied, through a potentiometer 8, by a battery 9 with a voltage, which is very slightly above the positive high voltage of the object. The difference corresponds substantially to the energy band acceptable for the secondary ions (taking into consideration the difference in work functions between the material forming the object, and the material forming the trap electrode).

The electrode assembly is mounted in a frame 10 by means of supports 11, 12 and 13.

According to another feature of the invention, the assembly has a quartz window 14 supported by a support 13; this transparent window permits the passage of the radiation emitted by a lamp 15 and concentrated by a mirror 16 on to the electrode 4. By its thermal action on the electrode 4, this radiation creates a thermal agitation so that contamination cannot occur.

Of course, any other known method for preventing the contamination of the electrode 4 may be used without thereby departing from the invention.

Generally the invention is not limited to the embodiments described and shown which were given solely by way of example.

What is claimed is:

1. An ionic microanalyser for providing selective ionic images of the surface of a sample, said microanalyser comprising:

means for bombarding said surface with primary particles, thereby extracting secondary ions from said surface;

lens means, having an axis, for accelerating and focusing said ions into a beam having a cross-over and providing an image of said surface;

magnetic field generating means, including two triangular pole pieces, for deflecting by a 90° angle those predetermined ions of said beam having a predetermined momentum-to-charge ratio in the prismatic gap defined by said pole pieces; said gap having a first face and a second face which are symmetrical of each other with respect to a symmetry plane normal to said axis of said lens means and intersect along an edge which is parallel to the direction of said magnetic field, and a third face which is normal to said symmetry plane; said pole pieces being so located with respect to said axis that said first face is intersected by said axis of said lens means at a point equidistant from said third face and from said symmetry plane, whereby said predetermined ions after entering said prismatic gap will emerge therefrom under the form of a deflected beam, centered on a further axis normal to said third face; said pole pieces being further so located, in the direction parallel to said axis of said lens means, that said deflected beam will have a further cross-over, centered on a point of said further axis, which is a real stigmatic image of said first mentioned cross-over;

an electrostatic convex mirror comprising a first apertured electrode, a solid electrode, and at least one intermediate apertured electrode between said first apertured electrode and said solid electrode, said convex mirror having an axis coinciding with said further axis, and a centre located at said point of said further axis;

a diaphragm having an aperture centered on said point of said further axis;

means for bringing said first apertured electrode to a predetermined potential;

means for adjusting the potential of said solid electrode, thereby adjusting the reflecting power of said mirror to allow those ions of said deflected beam which have an energy higher than a predetermined threshold to impinge on said solid electrode and to reflect those ions of said deflected beam having an energy lower than said threshold toward said third face of said prismatic gap, whereby said reflected ions will enter again said prismatic gap and emerge therefrom through said second face as an emergent beam, centered on said axis of said lens means, providing a further image of said sample surface, and having a cross-over which is a further image of said first mentioned cross-over;

means for adjusting the potential of said at least one intermediate apertured electrode, thereby adjusting the convergence of said mirror and the location of its apex inside said gap;

and means for visualizing said further image of said sample surface.

2. A microanalyser as claimed in claim 1, further comprising a stigmator located in the vicinity of one of said cross-overs, for correcting any residual astigmation of said further image of said sample surface.

3. A microanalyser as claimed in claim 1, wherein said diaphragm is said first apertured electrode.

4. A microanalyser as claimed in claim 1, wherein means are provided for heating said solid electrode.

References Cited

UNITED STATES PATENTS

| | | | |
|---|---|---|---|
| 2,772,363 | 11/1956 | Robinson | 250—41.9 |
| 2,947,868 | 8/1960 | Herzog | 250—41.9 |
| 3,126,477 | 3/1964 | Noda et al. | 250—41.9 |

FOREIGN PATENTS

| | | |
|---|---|---|
| 1,240,658 | 8/1960 | France. |
| 1,352,167 | 1/1964 | France. |

WILLIAM F. LINDQUIST, Primary Examiner

U.S. Cl. X.R.

250—41.9